United States Patent
Akizuki et al.

(10) Patent No.: US 7,958,339 B2
(45) Date of Patent: Jun. 7, 2011

(54) INSTRUCTION EXECUTION CONTROL DEVICE AND INSTRUCTION EXECUTION CONTROL METHOD

(75) Inventors: Yasunobu Akizuki, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/591,994

(22) Filed: Dec. 7, 2009

(65) Prior Publication Data
US 2010/0095092 A1    Apr. 15, 2010

Related U.S. Application Data

(63) Continuation of application No. PCT/JP2007/000653, filed on Jun. 20, 2007.

(51) Int. Cl.
G06F 9/44 (2006.01)
G06F 9/52 (2006.01)

(52) U.S. Cl. .................................. 712/217; 712/216

(58) Field of Classification Search .................. 712/217, 712/216
See application file for complete search history.

(56) References Cited

U.S. PATENT DOCUMENTS

| | | | |
|---|---|---|---|
| 6,076,157 A * | 6/2000 | Borkenhagen et al. | 712/228 |
| 6,212,544 B1 | 4/2001 | Borkenhagen et al. | |
| 6,434,591 B1 | 8/2002 | Watakabe et al. | |
| 6,535,905 B1 * | 3/2003 | Kalafatis et al. | 718/108 |
| 6,807,624 B1 | 10/2004 | Asakawa | |
| 2001/0056456 A1 | 12/2001 | Cota-Robles | |
| 2002/0161818 A1 | 10/2002 | Watakabe et al. | |
| 2004/0153622 A1 | 8/2004 | Asakawa | |
| 2004/0153628 A1 | 8/2004 | Asakawa | |
| 2004/0153629 A1 | 8/2004 | Asakawa | |
| 2004/0216103 A1 | 10/2004 | Burky et al. | |
| 2005/0033831 A1 * | 2/2005 | Rashid | 709/220 |
| 2005/0240752 A1 * | 10/2005 | Yokoi et al. | 712/1 |
| 2007/0067612 A1 | 3/2007 | Kan et al. | |
| 2008/0040589 A1 | 2/2008 | Sakamoto et al. | |

FOREIGN PATENT DOCUMENTS

| | | |
|---|---|---|
| JP | 2000-10800 | 1/2000 |
| JP | 2000-181705 | 6/2000 |
| JP | 2000-181707 | 6/2000 |
| JP | 3714598 | 9/2005 |
| JP | 2006-502504 | 1/2006 |
| JP | 2007-87108 | 4/2007 |
| WO | WO-99/21089 A1 | 4/1999 |
| WO | 2004/034209 | 4/2004 |
| WO | 2006/114874 | 11/2006 |

OTHER PUBLICATIONS

International Search Report for PCT/JP2007/000653, mailed Sep. 11, 2007.
International Search Report for PCT/JP2007/000653, mailed Sep. 11, 2007 (1 pg.).
Extended European Search Report dated Dec. 6, 2010 for corresponding European Application No. 07790179.1.

* cited by examiner

Primary Examiner — Daniel Pan
(74) Attorney, Agent, or Firm — Fujitsu Patent Center

(57) ABSTRACT

An instruction execution control device operates a plurality of threads in a simultaneous multi-thread system. And the instruction execution control device has a thread selection circuit (30) which detects a state where an instruction has not been completed for a predetermined period during simultaneous multi-thread operation, and controls such that all the reservation stations (5, 6 and 7) can execute only a predetermined thread. Therefore if an entry that cannot be executed from the reservation stations (5, 6 and 7) exists, execution of an entry in the thread that cannot be executed can be enabled by stopping the execution of the thread which has been executed continuously.

11 Claims, 17 Drawing Sheets

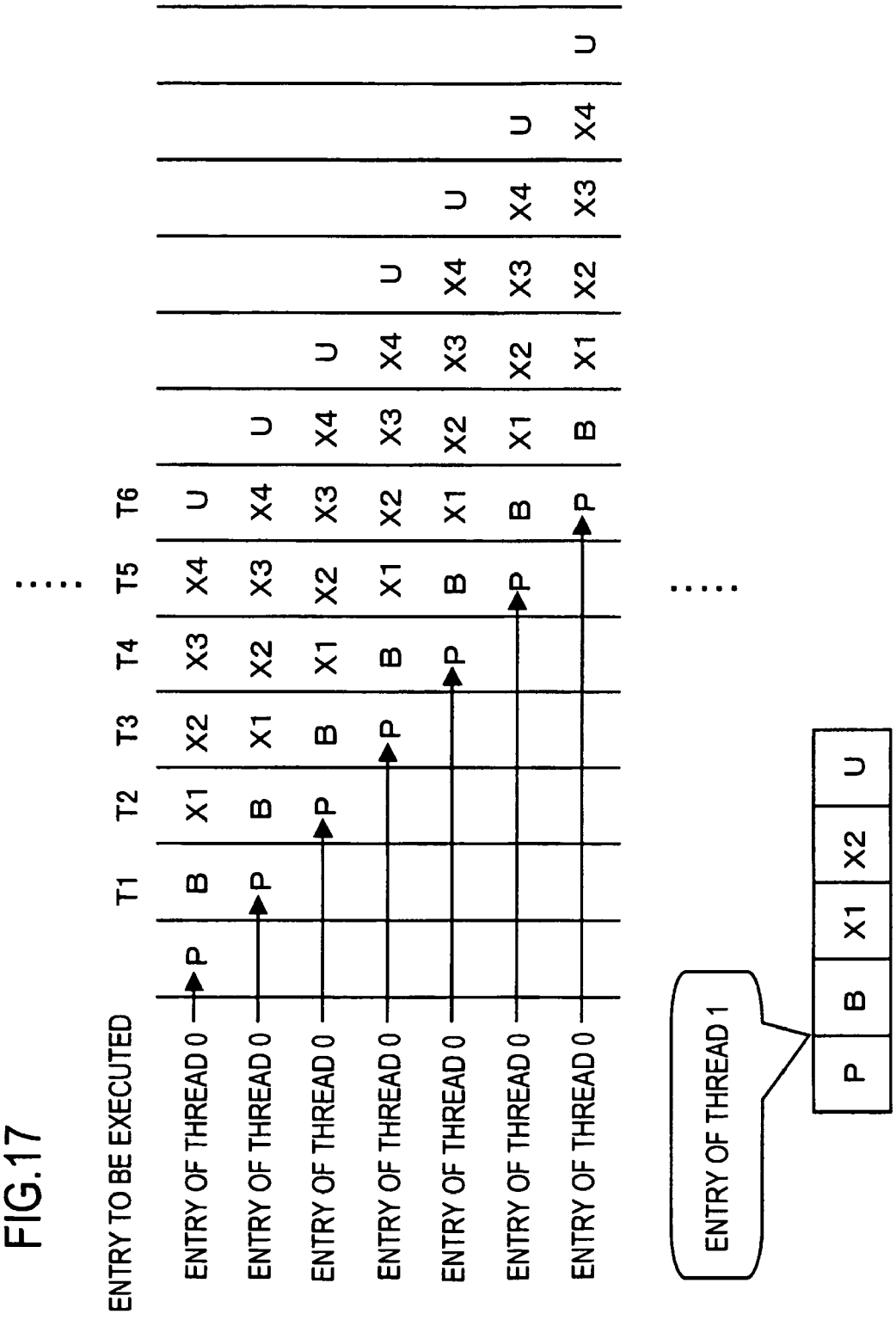

INSTRUCTION EXECUTION CONTROL DEVICE AND INSTRUCTION EXECUTION CONTROL METHOD

CROSS REFERENCE TO RELATED APPLICATIONS

This application is a continuation of International Application No. PCT/JP2007/000653, filed on Jun. 20, 2007, now pending, herein incorporated by reference.

TECHNICAL FIELD

The present invention relates to an instruction execution control device and instruction execution control method which controls instructions in an out-of-order processing during an operation of a plurality of threads operate in a simultaneous multi-thread system, and more particularly to an instruction execution control device and an instruction execution control method for preventing generation of a hang state during the operation in the simultaneous multi-thread system.

BACKGROUND ART

Higher speed processing is demanded for a CPU (Central Processing Unit). And for this, the processing of a CPU has been improved using various technologies. The methods used for this purpose are pipeline processing, a superscalar system which performs parallel processing, and an out-of-order execution system which executes instructions having completed input data with priority, without executing according to the sequence assigned to the program instructions.

The out-of-order execution system is a technology to improve performance of a CPU by executing a subsequent instruction first if data required for the first instruction is not completed and data required for the subsequent instruction processing is completed (e.g. see Patent Document 1).

For example, in the case of the processing instructions in the sequence written in a program, if a first instruction processing 1 is an instruction involving memory access, and a subsequent instruction processing 2 is an instruction which does not involve memory access, then the instruction processing 2 is executed in parallel with the memory access of the instruction processing 1, and the instruction processing 1 is executed after executing the instruction processing 2.

Further multi-thread system for improving processing of a CPU by allowing not a single program but a plurality of programs to run has been proposed (e.g. see Patent Document 2).

In this multi-thread system of allowing a plurality of programs to run, by providing a plurality of sets of programmable resources for a CPU, the system is equivalent to a plurality of CPUs operating under software emulation, therefore a plurality of programs can be executed.

One example of this multi-thread system is a VMT (Vertical Multi-Threading) system. According to this system, only one program can run at a time, but programs can be switched when a long data wait time is generated, or when a predetermined interval time elapses. For the circuit amount used for a VMT system, programmable resources are provided for the number of programs, but the circuit amount to be added is low, because of running only one program at a time, which is easily implemented.

Another example of a multi-thread system is a simultaneous multi-thread (SMT) system which allows a plurality of programs to run simultaneously. Since a plurality of programs run simultaneously, circuit control becomes more difficult and resources increase, compared with the case of allowing a single program to run, but the circuits can be efficiently used since a plurality of programs run at the same time.

Controlling the reservation station for processing the out-of-order execution allows an execution of functions from an entry which is ready for executing the function, with priority.

When the functions are executed by the pipeline processing and a type of instruction requiring a different time for executing a respective function are executed, the reservation station controls execution of the entries, so that the timings to output the result of a respective execution of the function do not overlap.

FIG. 15 is a time chart depicting entry execution control of a reservation station for floating point. In the case of the floating point computing, an execution result of pipeline processing is stored in a result register, and at this time, the reservation station selects an entry to be executed so that the timing to be stored in the result register does not overlap with storing the timing of another execution result.

FIG. 15 depicts a control example of a subsequent instruction when an entry to be executed by the reservation station is an entry which requires 4 cycles for execution (precedent instruction), and the subsequent instruction is an entry which requires 2 cycles for execution.

In FIG. 15, T1 to T7 are cycles, P is a processing to select an entry to be executed from the reservation station, B is a processing to read operand data required for executing a function, X is a processing to store the execution result in the result register in the function execution and last cycle, and U is a processing to store the function execution result in the register update buffer.

The precedent instruction requires 4 cycles: X1, X2, X3 and X4 for executing a function, and the subsequent instruction requires 2 cycles: X1 and X2 for executing a function. When the reservation station selects the precedent instruction in cycle T1, the U processing does not overlap, so the subsequent instruction requiring 2 cycles can be executed at timing T2. At timing T3, however, if the subsequent instruction requiring 2 cycles is executed, the timing T7, to store the execution result in the result register (U processing), becomes the same as the precedent instruction requiring 4 cycles, therefore the subsequent instruction cannot be executed here. At timing T4, the subsequent instruction requiring 2 cycles can be executed.

FIG. 16 depicts an example of executing an entry operating in a single thread by the selection operation of the reservation station under this pipeline control. The meaning of P, B, X and U in FIG. 16 is the same as those in FIG. 15.

FIG. 16 is a time chart when an entry requiring 4 cycles for execution is continuously selected by the reservation station, and in this state, an entry requiring 2 cycles for execution is decoded by the instruction decoder, and then an entry requiring 4 cycles for execution is continuously decoded by the instruction decoder.

The reservation station issues (executes) entries sequentially as an entry becomes ready for execution. When there are a plurality of entries that can be executed at the same time, the entries are selected and executed in the decoded sequence.

Therefore even if an entry is ready for execution of the function, the entry may not become an entry which can be executed depending on the result output timing of the previous entry being executed.

When such a state continues for a long time, it is impossible to execute an entry from the reservation station. In the case of FIG. 16, even if the entry requiring 2 cycles for execution becomes ready for execution and the reservation station attempts to execute it, the execution is impossible since the timing of storing the execution result in the result register becomes the same as that of the precedent instruction requiring 4 cycles.

In the case of a single thread, if a predetermined number of instructions are decoded by the instruction decoder after the state where an entry cannot be issued from the reservation station is generated, the entry having the instruction completion control function become FULL state.

In other words, the instruction cannot be completed because the entry cannot be issued from the reservation station. A subsequent instruction can be executed from the reservation station, but the instruction cannot be completed.

As a result, the entry having the function to control completion of an instruction becomes FULL state, and instructions cannot be decoded by the instruction decoder (instruction decoder stopping state). Since an instruction is not decoded and a new entry cannot be created in the reservation station, the entry which cannot be executed (entry having 2 cycles in FIG. 16) can be executed in cycle T5, for example, and the instruction can be completed.

Patent Document 1: Japanese Patent Application Laid-Open No. 2007-87108
Patent Document 2: Published Japanese Translation of PCT application No. 2006-502504 (WO 2004/034209)

In the case of a simultaneous multi-thread system, on the other hand, when an entry of the reservation station is shared by threads, an entry, among entries being readied for execution of a function, of which result output timing is not the same as that of the precedent entry, is selected and executed from the reservation station as an executable entry, regardless the thread of the entry in the reservation station.

In this simultaneous multi-thread system as well, just like the single thread system, even if an entry is ready for execution of a function, the entry may not become an executable entry, depending on the result output timing of the previous entry being executed. If such a state continues for a long time, executing an entry from the reservation station becomes impossible.

FIG. 17 is an example when an entry requiring 4 cycles for execution is executed continuously from the reservation station, and an instruction requiring 4 cycles for execution is decoded by the instruction decoder in the thread 0, in a state of threads 0 and 1 operating in the simultaneous multi-thread.

In this state, if an entry requiring 2 cycles for execution is decoded by the instruction decoder in the thread 1, and then an entry requiring 4 cycles for execution is continuously decoded in the thread 0, the entry requiring 2 cycles for execution in the thread 1 cannot be executed from the reservation station even if this is attempted, since the timing of being stored in the result register becomes the same as that of the precedent instruction.

In the case of the simultaneous multi-thread system, even if an entry which cannot be executed from the reservation station is generated, the other thread can operate without the resource becoming FULL state, and the instruction decoder does not stop, unlike the case of the single thread system.

In other words, in the case of the simultaneous multi-thread system, the instruction in the thread 0 can be completed even after the instruction is executed, so the instruction decoder can decode the instruction in the thread 0. Hence the thread 0 can continuously operate without stopping.

An entry in the thread 1, however, cannot be executed from the reservation station, so the instruction cannot be completed, and the device enters the hang state.

In other words, in the state where execution from the reservation station is impossible, a state where an instruction cannot be completed for a predetermined period (hang state) is detected as an abnormal state, and the CPU stops operation.

SUMMARY OF THE INVENTION

With the foregoing in view, it is an object of the present invention to provide an instruction execution control device and an instruction execution control method to enable execution of an entry in the reservation station before the hang state occurs in the processing of the simultaneous multi-thread system.

It is another object of the present invention to provide an instruction execution control device and an instruction execution control method to enable execution of an entry in the reservation station, and to prevent a major performance drop in the processing of the simultaneous multi-thread system.

It is still another object of the present invention to provide an instruction execution control device and an instruction execution control method to enable execution of an entry in the reservation station and to prevent a CPU stop in the processing of the simultaneous multi-thread system.

MEANS FOR SOLVING THE SUBJECTS

To attain the above-described object, this invention provides an instruction execution control device, which operates a plurality of thread in a simultaneous multi-thread system and executes an instruction control in an out of order processing, including: an instruction decoder for decoding an instruction; a computing processing reservation station which receives a decoding result from the instruction decoder, and controls computing processing; a main storage reservation station which controls the generation of an address of an operand to be stored in a main storage; an instruction control mechanism which controls executed instructions so that the instructions are completed according to the sequence of a program; and a hang prevention circuit which, when the instruction control mechanism detects that an instruction in one thread cannot be completed in a predetermined period, selects a thread of an entry that can be executed from all of the reservation stations to be the same as the thread of which incompletion in the predetermined period has been detected.

Further, this invention provides an instruction execution control method which operates a plurality of thread in a simultaneous multi-thread system and executes an instruction control in an out of order processing, including: a step of creating an entry by a computing processing reservation station based on a decoding result by an instruction decoder, and issuing an entry which is ready for execution to a computing processing mechanism; a step of creating an entry from the instruction by a main storage reservation station which controls the generation of an address of an operand to be stored in a main storage, and issuing an entry which is ready for execution to a main storage operand address generator; a step of controlling the executed instructions so that the instructions are completed according to the sequence of a program; and a step of, when it is detected that an instruction in one thread cannot be completed in a predetermined period, selecting a thread of an entry that can be executed from all of the reservation stations to be the same as the thread of which incompletion in the predetermined period has been detected.

Also in the present invention, it is preferable that the hang prevention circuit includes a thread selection circuit which, when it is detected to have not completed the thread in the predetermined period, selects a thread of an entry that is executed from the reservation station to be the same as the thread of which incompletion in the predetermined period has been detected.

Also in the present invention, it is preferable that the hang prevention circuit further includes an executability selection circuit which, when a thread selected by the thread selection circuit matches with a thread of an entry of the reservation station, enables the entry to be executed from the reservation station.

Also in the present invention, it is preferable that the thread selection circuit is constructed as a thread selection circuit which changes a thread to be selected depending on an elapsed time.

Also in the present invention, it is preferable that the thread selection circuit prohibits selecting a thread which is not operating based on a signal to indicate a thread which is operating.

Also in the present invention, it is preferable that the hang prevention circuit stops the control of the reservation station when the uncompleted instruction is completed.

Also in the present invention, it is preferable that the reservation station includes: an entry generation circuit which enters an instruction from the instruction decoder to the reservation station; and an execution entry selection circuit which selects an entry that can be executed from the reservation station.

Also in the present invention, it is preferable that the computing processing reservation station executes an entry which is ready for execution, at a timing which does not overlap with the timing of executing the precedent entry or the timing of storing the execution result of the precedent entry.

EFFECTIVENESS OF THE INVENTION

A state where an instruction is not completed for a predetermined period is detected during simultaneous multi-thread operation, and it is controlled so that all the reservation stations can execute only a predetermined thread, therefore if an entry that cannot be executed from the reservation station exists, execution of an entry in the thread that cannot be executed can be enabled by stopping the execution of the thread which has been continuously executed.

BRIEF DESCRIPTION OF THE DRAWINGS

FIG. 17 is an example of executing an entry operating in multi-thread by the selection operation of the conventional reservation station.

EXPLANATION OF LETTERS OR NUMERALS

1 INSTRUCTION FETCH ADDRESS GENERATOR
2 PRIMARY INSTRUCTION CACHE
3 INSTRUCTION BUFFER
4 INSTRUCTION DECODER
5, 6, 7 RESERVATION STATION
10 OPERAND ADDRESS GENERATOR
12, 15 COMPUTING UNIT
13, 16 UPDATE BUFFER
14, 17 REGISTER
30 THREAD SELECTION CIRCUIT
50, 60, 70 ENTRY GENERATION CIRCUIT
52, 62, 72 EXECUTABILITY SELECTION CIRCUIT
56, 66, 76 EXECUTION ENTRY SELECTION CIRCUIT
54 RESERVATION STATION FOR GENERATING MAIN STORAGE OPERAND
64, 74 RESERVATION STATION FOR COMPUTING PROCESSING

PREFERRED EMBODIMENTS

Embodiments of the present invention will now be described with reference to the drawings, in the sequence of an information processing device, an instruction execution control device, a hang prevention mechanism, a thread selection circuit and other embodiments. The present invention, however, is not limited to the following embodiments, but can be modified in various ways.

(Information Processing Device)

Figure 1:
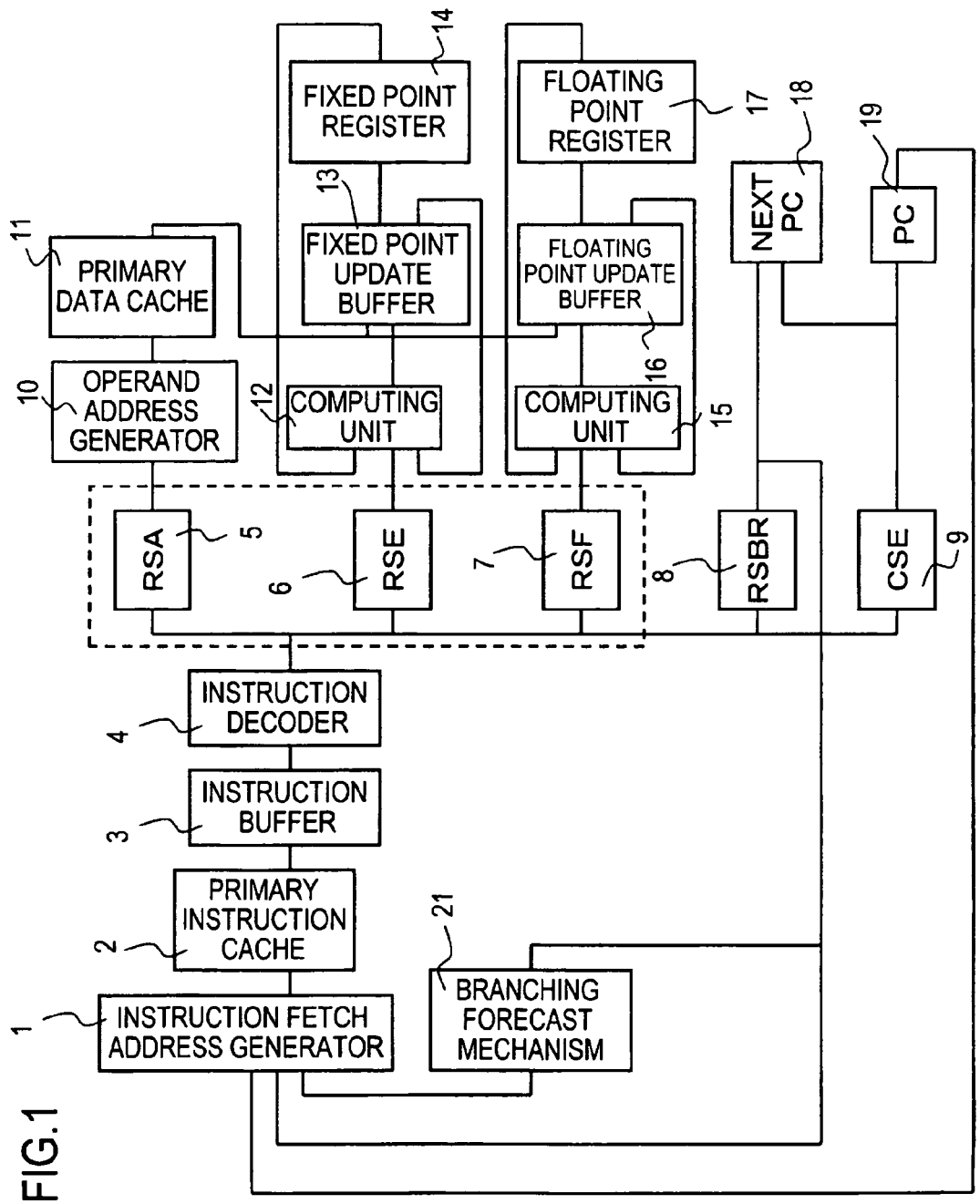
FIG. 1 is a block diagram of an embodiment of an image processing device according to the present invention.

FIG. 1 is an overview of an embodiment of an information processing device according to the present invention. As FIG. 1 depicts, a primary instruction cache 2 and a primary data cache 11 are connected to a secondary cache, in connection with a main storage, which is not illustrated.

In order to fetch instructions, an instruction fetch address generator 1 selects an instruction address and sends an instruction fetch request for the selected instruction address to the primary instruction cache 2. The instruction fetched from the primary instruction cache 2 is stored in an instruction buffer 3. The stored instructions are supplied to an instruction decoder 4 in the execution sequence of the program from the instruction buffer 3.

The instruction decoder 4 decodes the instructions according to the execution sequence of the program. Depending on the type of instruction to be decoded, the instruction decoder 4 creates a required entry for a reservation station unit for generating a main storage operand address (RSA: Reservation Station for Address generate) 5, a reservation station unit for computing a fixed point (RSE: Reservation Station for Execute) 6, a reservation station unit for computing a floating point (RSF: Reservation Station for Floating) 7, and a reservation station unit for branch instruction (RSBR (Reservation Station for BRanch) 8, which controls execution of instructions.

In other words, the instruction decoder 4 decodes a fetched instruction in-order, and the decoded instruction is stored in the reservation station units 5, 6, 7, 8 and 9, which control the execution of functions respectively, depending on the type of instruction. A reservation station unit has reservation station units for computing 6 and 7, and reservation station unit for generating a main storage operand address 5.

An entry is created in a commit stack entry (CSE: Commit Stack Entry) 9 for controlling completion of an instruction, for all the decoded instructions.

If a decoded instruction is a load instruction when an entry is created in RSA5, the RSA5 instructs an operand address generator 10 to generate an operand address, reads the corresponding data from the primary data cache 11 to a fixed point update buffer (GUB: General Update Buffer) 13 and a floating point update buffer (FUB: Floating Update Buffer) 16.

If the decoded instruction created an entry in RSE6 and RSF7, each computing unit 12 and 15 is operated so as to execute corresponding computing processing. In the case when the decoded instruction creates an entry in RSA5, RSE6 and RSF7, an out-of-order execution can be enabled by renaming registers corresponding to GUB13 and FUB16, and the execution result is stored in GUB13 and FUB16.

Instructions executed based on an out-of-order by the reservation stations 5, 6 and 7 are completed according to the sequence of the program by the control of CSE9. Programmable resources, such as a fixed point register 14 and floating point register 17 and program counters (PC, NEXT_PC) 18 and 19, are updated only for the completed instructions.

The branching forecasting mechanism 21 forecasts branching by an instruction from the reservation station for branching instruction 8, so as to control the instruction fetch address generator 1.

As mentioned later, the reservation station units 5, 6, 7 and 8 selects a thread for each computing cycle, instructs an execution of the selected thread to the operand address generators 10 and computing units 12 and 15, and reads and writes operand data of the thread selected from and to the registers 14 and 17, whereby the simultaneous multi-thread processing is executed.

(Instruction Execution Control Device)

Figure 2:
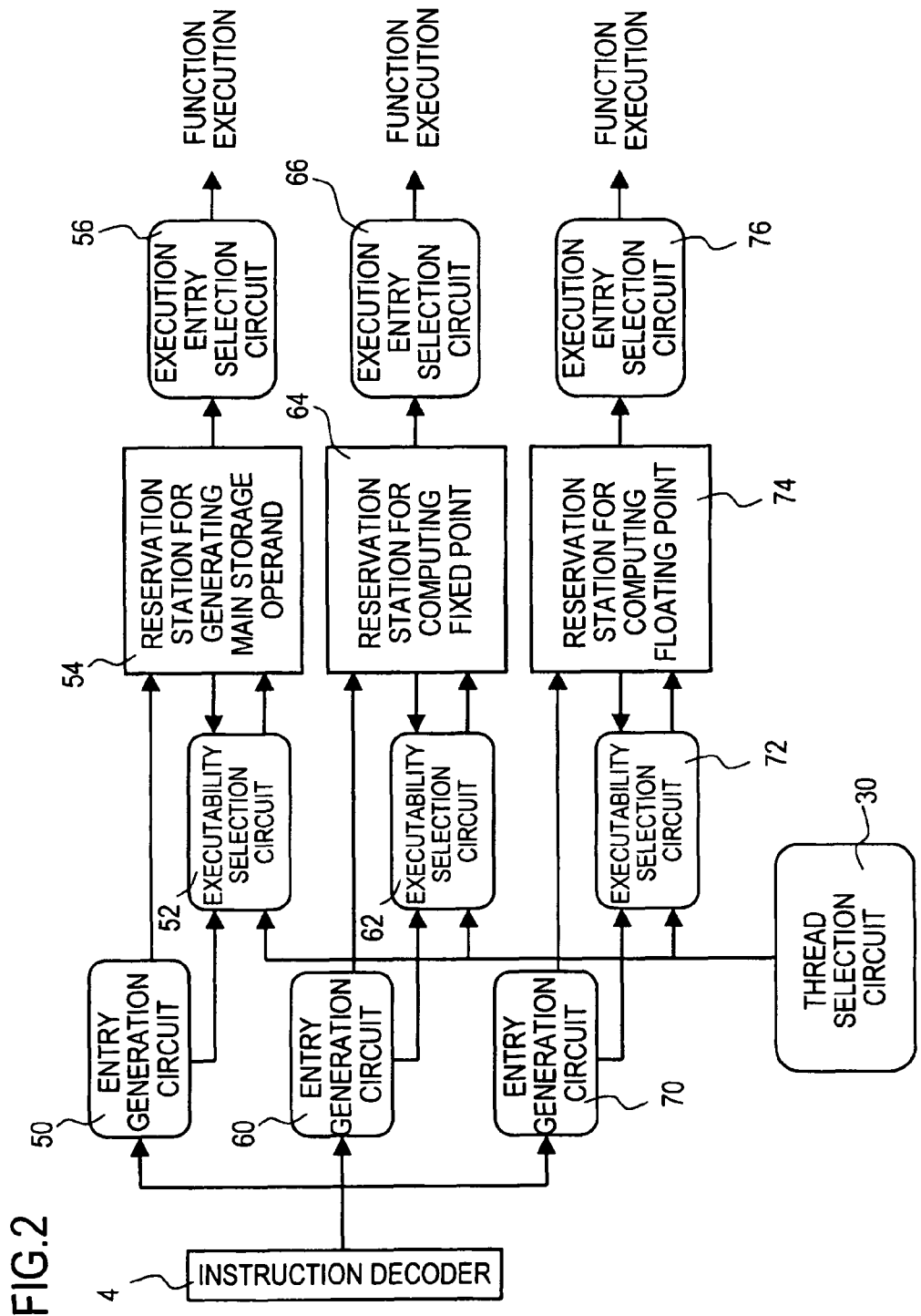
FIG. 2 is a block diagram depicting an embodiment of the instruction execution control device of the present invention.
Figure 3:
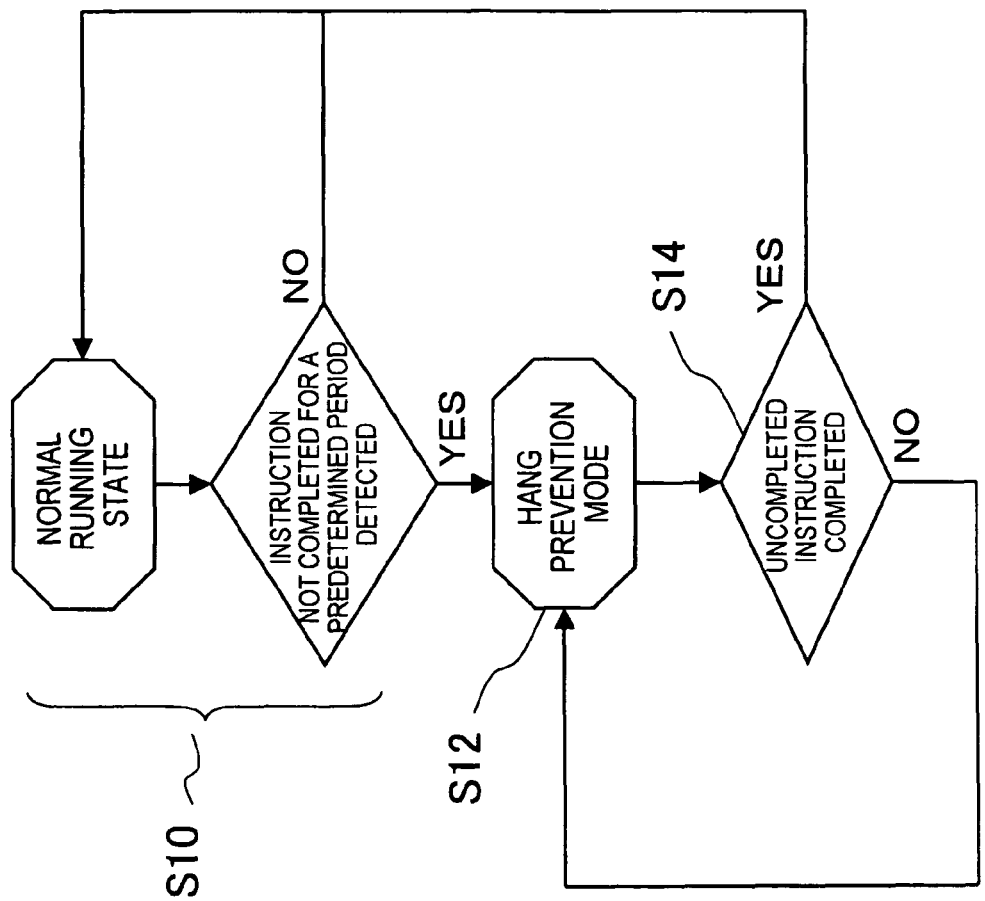
FIG. 3 is a flow chart depicting an operation of the instruction execution control device in FIG. 2.
Figure 4:
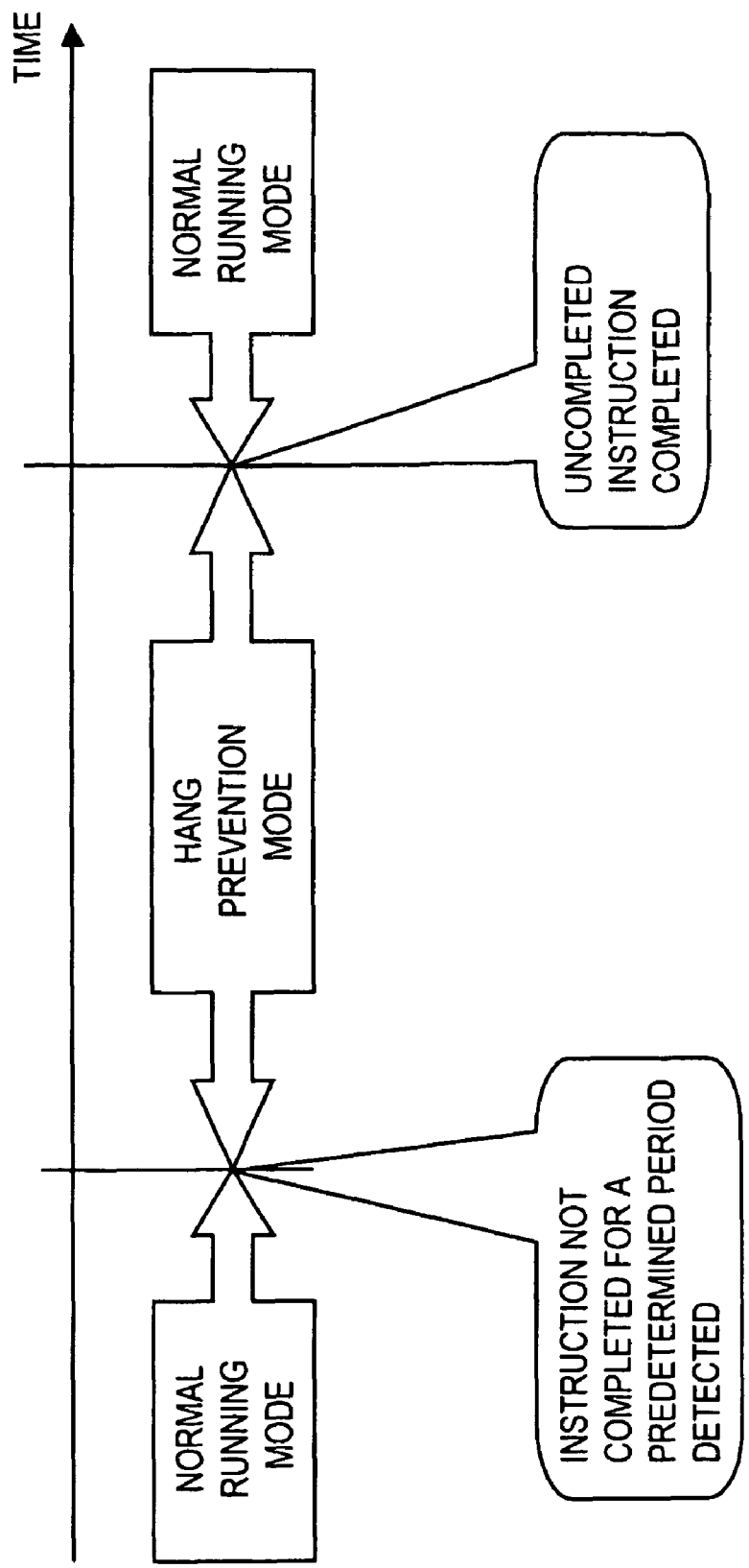
FIG. 4 is a diagram depicting the operation of the instruction execution control device in FIG. 2
Figure 5:
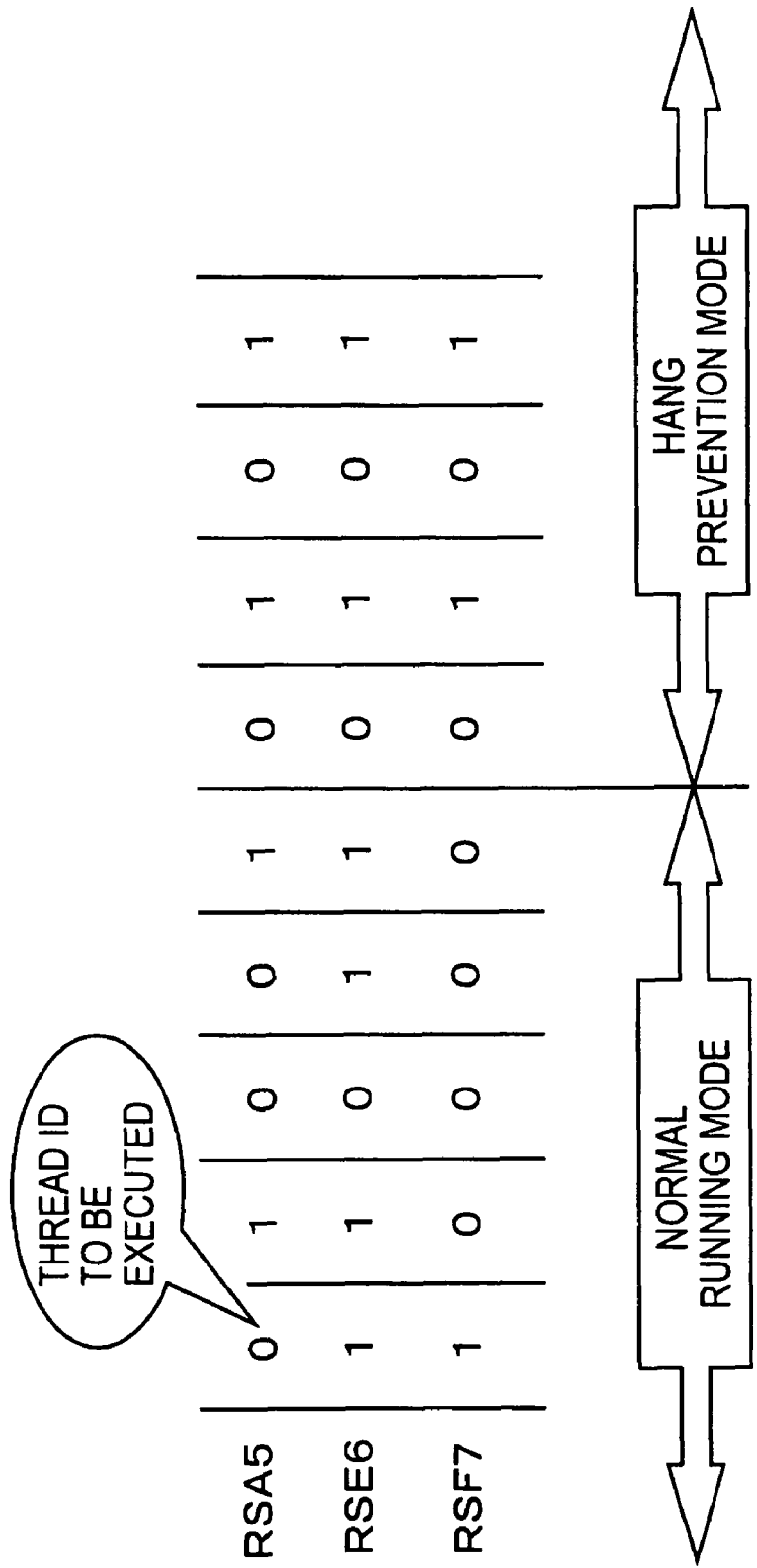
FIG. 5 is a diagram depicting a thread selection method executed in the instruction execution control device in FIG. 2.

FIG. 2 is a block diagram depicting an embodiment of the instruction execution control device of the present invention, FIG. 3 is a flow chart depicting an operation of the configuration in FIG. 2, FIG. 4 is a diagram depicting the operation in FIG. 3, and FIG. 5 is a diagram depicting the execution thread based on the operation in FIG. 2 to FIG. 4. FIG. 2 is a detailed diagram of RSE5, RSE6 and RSF7 in FIG. 1. In this embodiment, the case of two threads (threads 0 and 1) operating simultaneously is described, but the present invention can also be implemented even if the number of threads is three or more.

In FIG. 2, composing elements the same as FIG. 1 are denoted with a same symbol, and the reservation units 5, 6 and 7 are comprised of entry generation circuits 50, 60 and 70, executability selection circuits 52, 62 and 72, reservation stations 54, 64 and 74, and execution entry selection circuits 56, 66 and 76 respectively. A thread selection circuit 30 is connected to each of the executability selection circuits 52, 62 and 72.

The entries in the reservation station units 5, 6 and 7 are used to share the threads 0 and 1. In other words, an entry stores: a VALID signal to indicate that the entry is valid, a thread ID to indicate a thread of the entry, a signal to indicate to read the operand data from the architecture register and the read address, a signal to indicate to read from the register update buffer and the read address, and an instruction identifier to indicate a number of an instruction to be allocated to each instruction when the instruction is decoded, for example.

Figure 6:
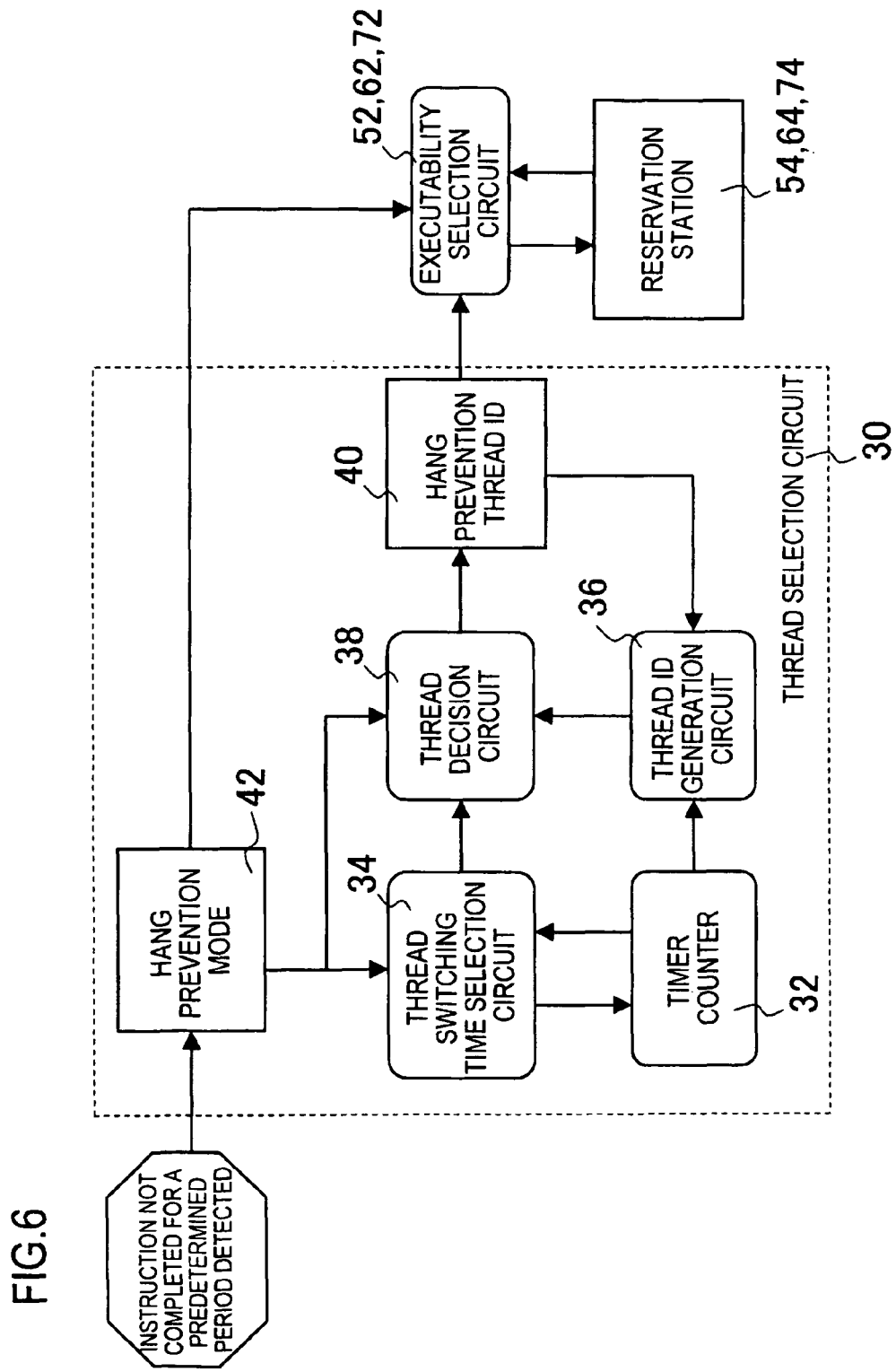
FIG. 6 is a block diagram depicting the thread selection circuit in FIG. 2.

As described in detail in FIG. 6, when CSE9 in FIG. 1 detects an instruction which has not completed for a predetermined time, the thread selection circuit 30 switches the running mode to the hang prevention mode, and selects a hang prevention thread ID.

In the hang prevention mode, the executability selection circuit 52, 62 or 72 compares the entries of the entry circuit 50, 60 or 70, and the reservation station 54, 64 or 74 with the thread ID of the thread selection circuit 30, and selects an executable entry.

The execution entry selection circuit 56, 66 or 76 selects an executable entry from the entries of the reservation station 54, 64 or 74, and issues it to the function execution unit 10, 12 or 15.

These operations will now be described. When a plurality of threads operates in the simultaneous multi-thread system, the reservation station 54, 64 or 74 can use out-of-order execution. In other words, the entries of the reservation station 54, 64 or 74 can execute from the entry of which operand data required for execution has become ready.

The entry selected by the execution entry selection circuit 46, 56 or 66 for selecting an entry to be executed is executed from the reservation station 54, 64 or 74. If a plurality of entries is ready for execution simultaneously, the execution entry selection circuit 46, 56 or 66 selects and executes an entry in the decoded sequence.

For the entry executed from the reservation station for floating point 74, a function is executed by pipeline processing. The function execution completes, and the function execution result is stored in the result register. Completion of the execution of the function is reported to the function CSE9, which controls completion of instructions.

The instruction completion control function CSE9 performs control of a complete of the instruction according to the sequence of the program. When function execution completes, the instruction can be completed, but since the completion control of the instruction are executed according to the sequence of the program, the subsequent instruction cannot be completed even if the execution thereof is completed, unless the oldest instruction is completed. The instructions are completed in each thread independently, so the instruction can be completed without being interrupted by other threads.

Figure 15:
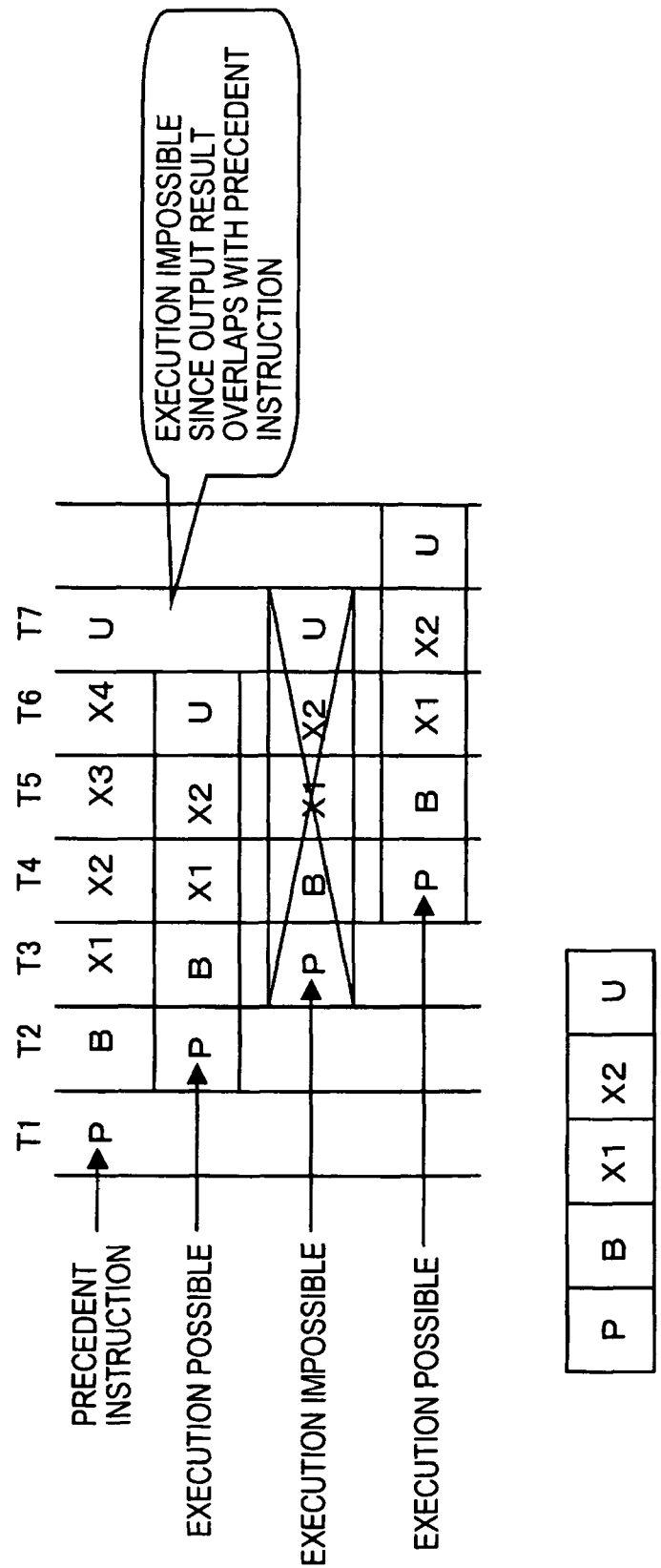
FIG. 15 is a time chart depicting entry execution control of the conventional reservation.
Figure 16:
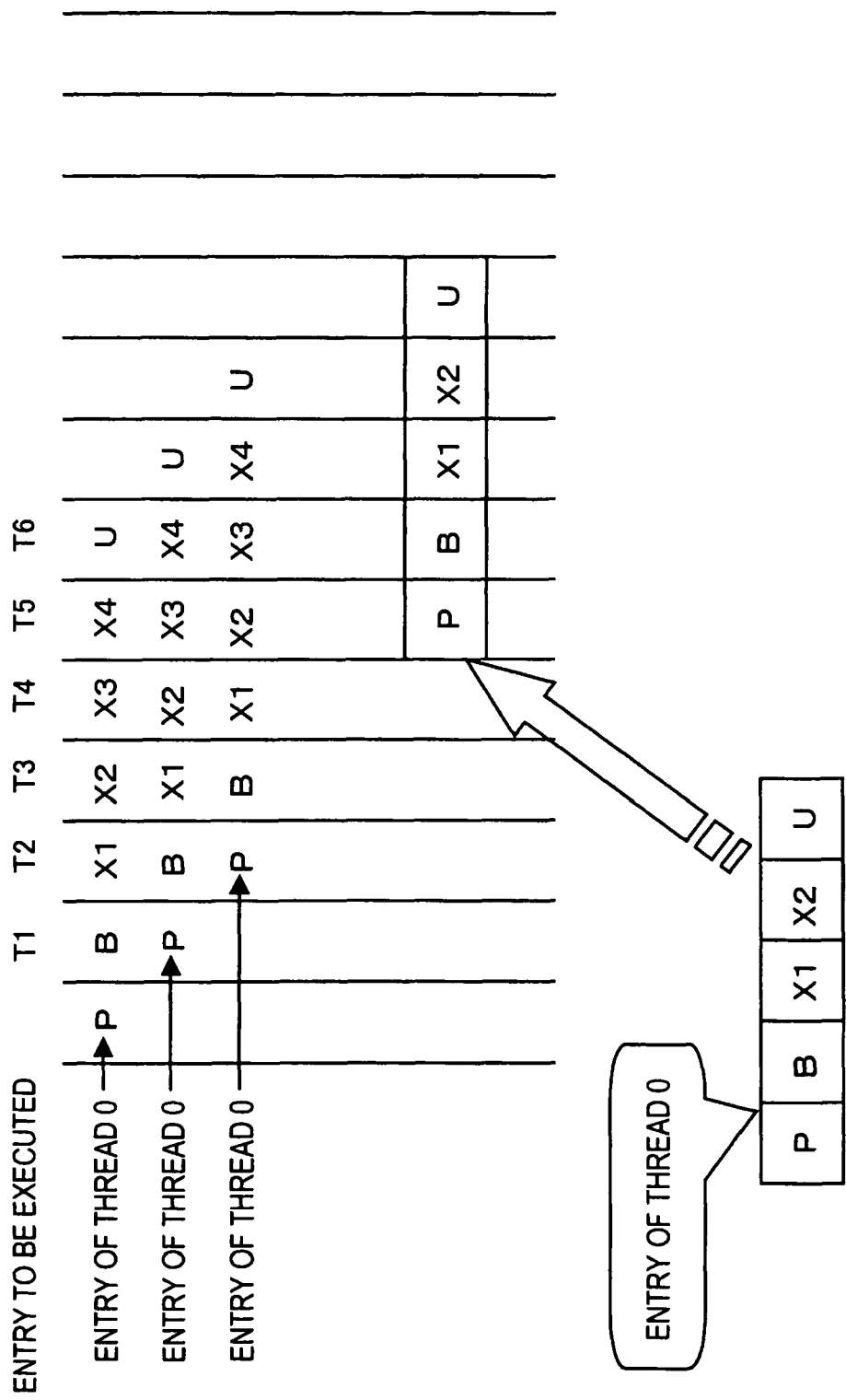
FIG. 16 depicts an example of executing an entry operation in a single thread by the selection operation of the conventional reservation station.

As described in FIG. 15, the result of function execution by pipeline processing is stored in the result register, but the reservation station 74 selects the entry to be executed such that timings to be stored in the result register does not overlap.

Now the operation in the configuration in FIG. 2 will be described with reference to FIG. 3 to FIG. 5. The thread selection circuit 30 judges whether or not CSE9 transmitted a signal to indicate the detection of an instruction which has not completed for a predetermined time in the normal running state (S10). When the thread selection 30 receives the signal to indicate detection of an instruction which has not completed for a predetermined time from CSE9, the thread selection 30 changes the running mode to the hang prevention mode (S12).

In the normal running time depicted in FIG. 4, the thread selection circuit 30 is not used, so as FIG. 5 depicts, a thread number of the thread of instructions to be executed from each reservation station 5, 6 or 7 is the number of an entry selected by each reservation station 5, 6 or 7 respectively. In other words, as FIG. 5 depicts, entry selection in the reservation station is not limited to the specific thread, and the thread number for execution differs depending on each reservation station 5, 6 or 7. Since each reservation station 5, 6 or 7 independently selects a thread number, the thread number for execution may accidentally become the same as the thread number selected by another reservation station.

In the hang prevention mode, however, only the thread number selected by the thread selection circuit 30, which operates during the hang prevention mode, can be an executable thread number. In other words, as FIG. 5 depicts, thread numbers to be executed from the reservation stations 5, 6 and 7 are controlled to be the same.

When the thread selection circuit 30 is notified from CSE9 that the instruction which could not be completed for a predetermined time completed, the thread selection circuit 30 returns the mode to the normal running mode as depicted in FIG. 4, and stops the thread selection operation (S14).

In this way, while the reservation stations execute the executable entries, regardless the thread in the normal running mode, only a thread determined by each reservation station is allowed to execute in the hang prevention mode.

In other words, when an entry of one thread cannot be executed and subsequent entries of another thread are sequentially executed, execution of this other thread, where entries are sequentially executed, is stopped, whereby the entry of the one thread which cannot be executed can be set to the executable state. When a hang state occurs by a cause other than the reservation station as well, the reservation stations are controlled so that only a predetermined thread can be executed.

If this control is performed, however, execution of the entry in a thread which is not in the hang state is stopped, therefore control is performed so that performance does not drop considerably even if the hang state occurs, and then the thread in the hang state is executed.

(Hang Prevention Mechanism)

Figure 7:
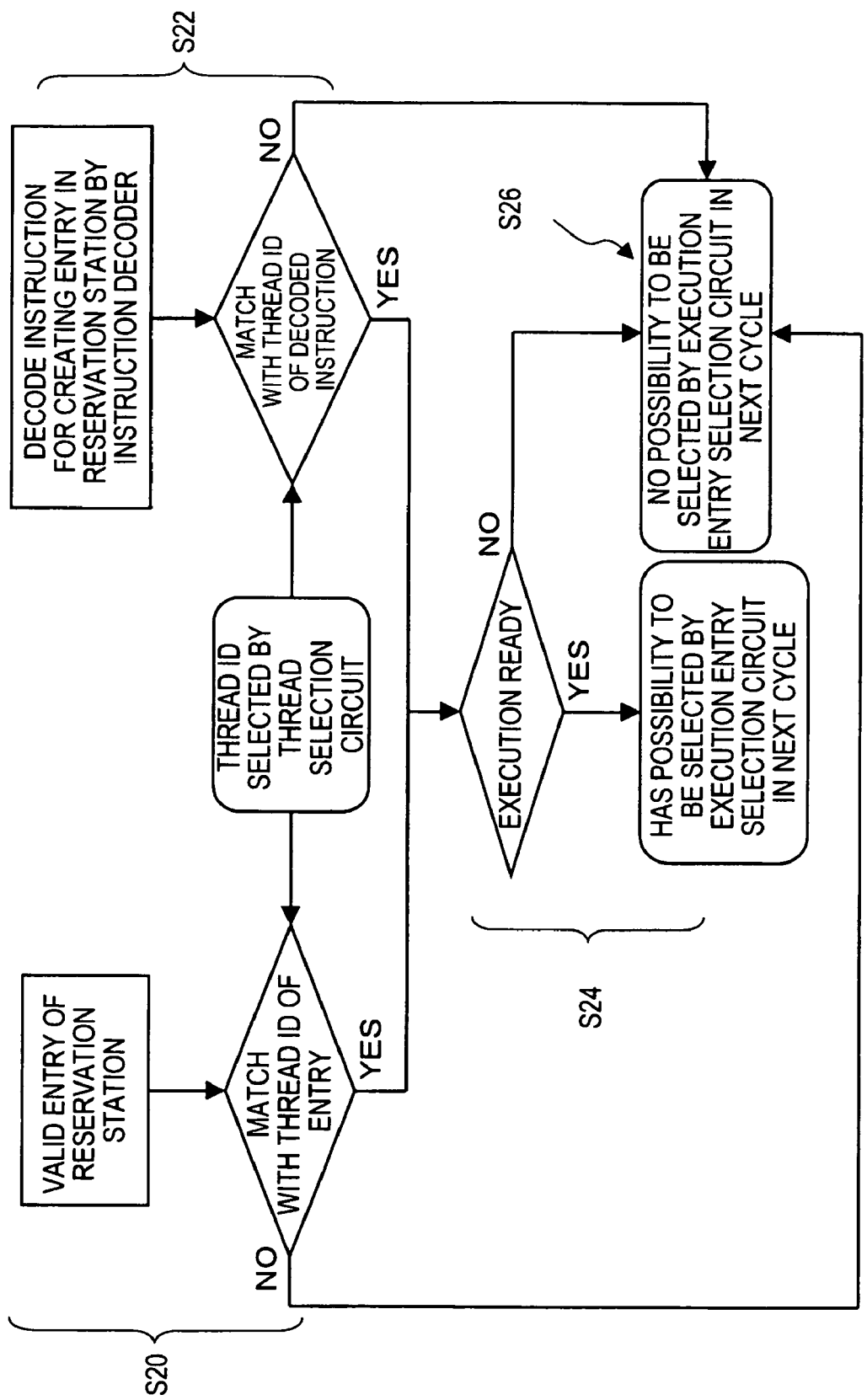
FIG. 7 is a flowchart depicting the processing of the executability selection circuit in FIG. 6.
Figure 8:
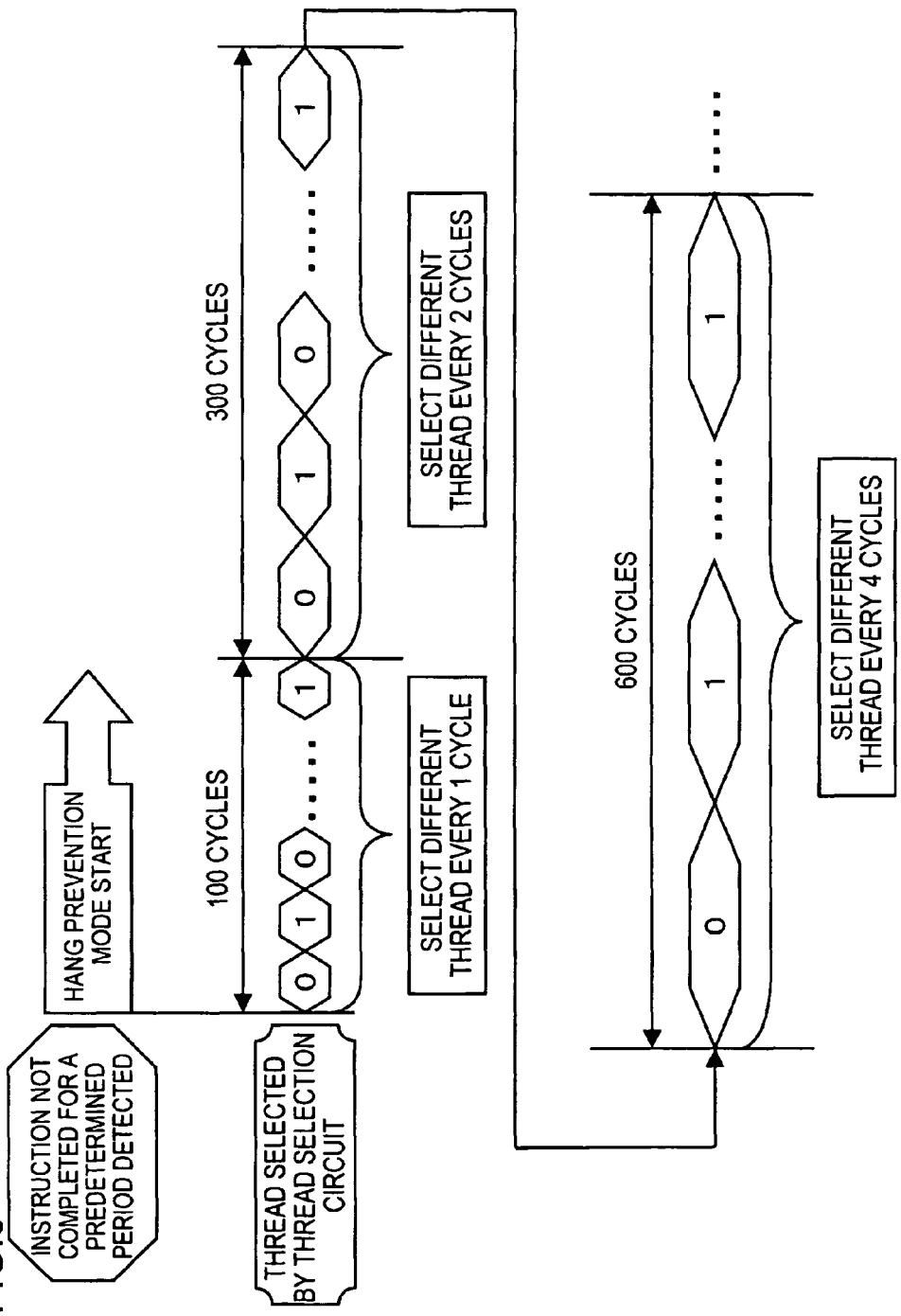
FIG. 8 is a diagram depicting a thread selection operation executed by the thread selection circuit in FIG. 6.
Figure 9:
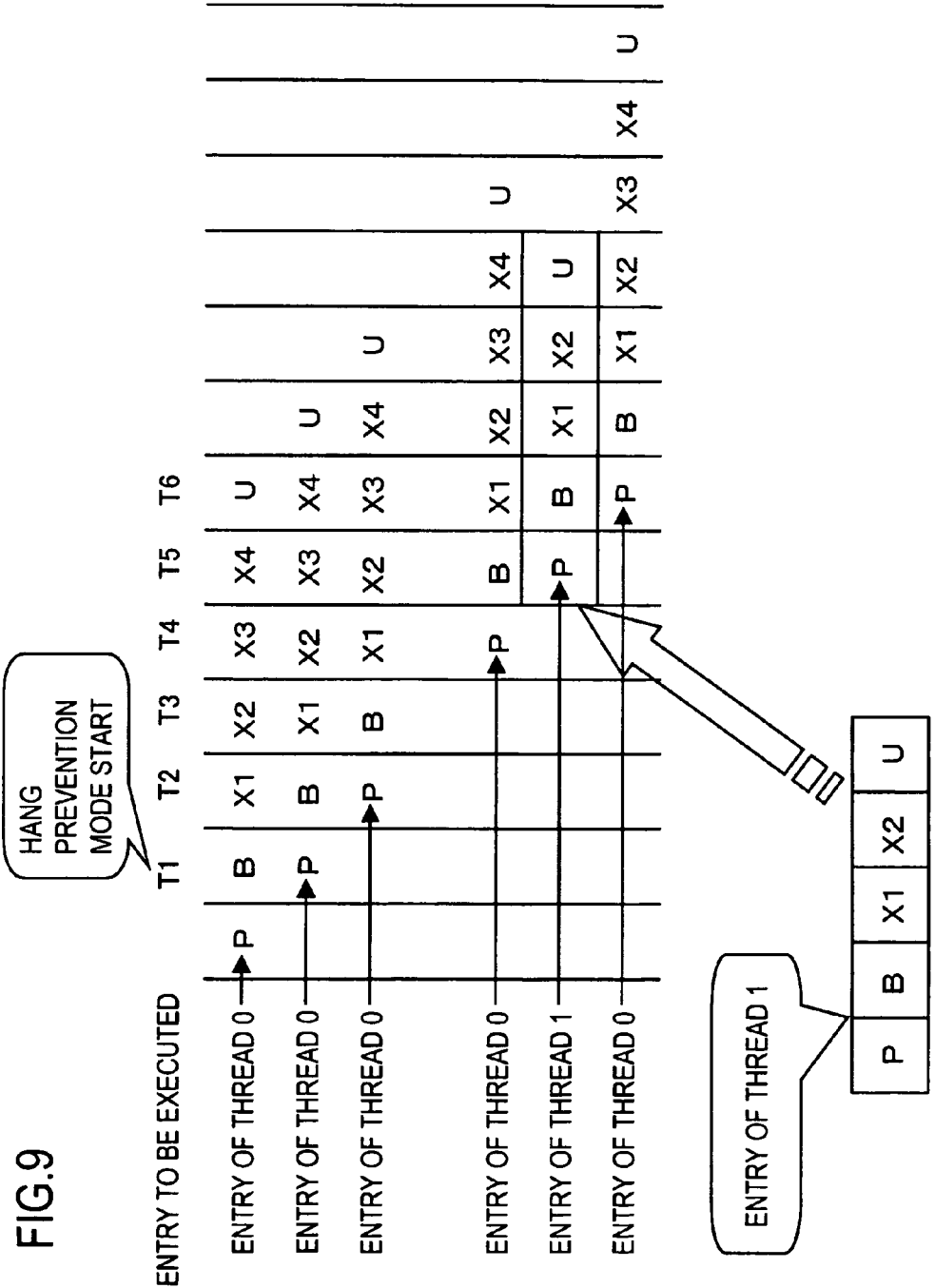
FIG. 9 is a diagram depicting an execution selection operation of an entry of the reservation station for floating point in FIG. 2.
Figure 10:
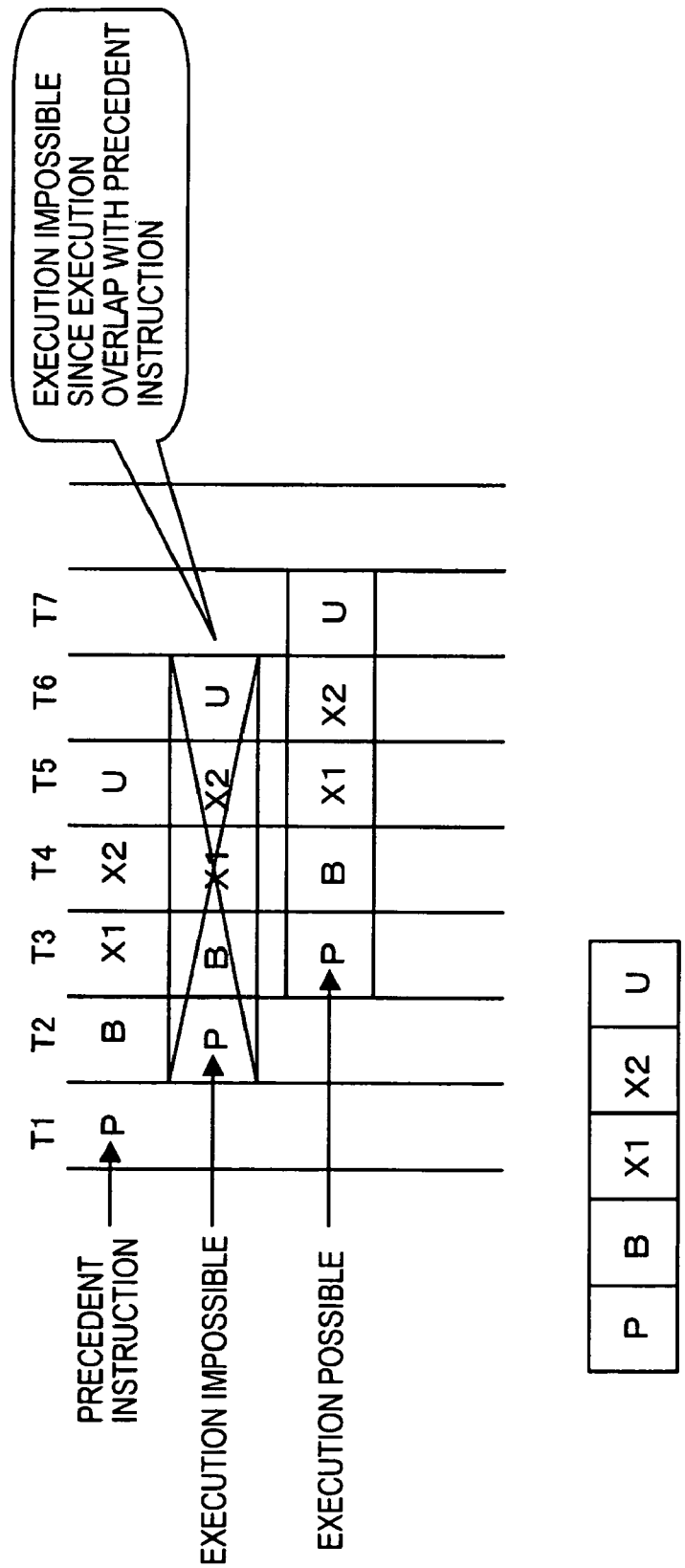
FIG. 10 is a diagram depicting an execution selection operation of the reservation station for fixed point in FIG. 2.

The instruction execution control device in FIG. 2 will now be described in detail. FIG. 6 is a block diagram depicting the thread selection circuit 30 in FIG. 2, FIG. 7 is a flow chart depicting the processing of the executability selection circuit in FIG. 2 and FIG. 6, FIG. 8 is a diagram depicting a thread selection method based on the configuration in FIG. 6, FIG. 9 is a diagram depicting an execution selection operation of an entry of the reservation station in FIG. 6, and FIG. 10 is a diagram depicting an execution selection operation of the reservation station for fixed point in FIG. 6.

FIG. 6 to FIG. 9 are described using the example of the reservation station unit for floating point 7 in FIG. 2. The reservation station unit for fixed point 6 in FIG. 2 and the reservation unit for generating operand 5 also have the same configuration.

The configuration of the thread selection circuit 30 will be described with reference to FIG. 6. The thread selection circuit 30 changes the thread number alternately along the time axis, and outputs it. As FIG. 6 depicts, the thread selection circuit 30 has a timer counter 32, a thread switching time selection circuit 34, a thread ID generation circuit 36, a thread decision circuit 38, a hang prevention thread ID register 40, and a hang prevention mode start circuit 42.

The hang prevention mode start circuit 42 starts the thread switching time selection circuit 34, thread decision circuit 38 and executability selection circuits 52, 62 and 72 according to a detection signal when an instruction, which has not completed for a predetermined time, was detected in CSE9 in FIG. 1.

The thread switching time selection circuit 34 has a thread switching time to indicate time to select a same thread continuously, and instructs the thread decision circuit 38 to switch the thread when the thread switching time arrives. The thread switching time can be changed when a counter value reaches a certain value by the timer counter 32, which increments 1 every 1 cycle.

The thread decision circuit 38 selects a thread ID of the thread ID generation circuit 36 using the thread switching time and the counter value of the timer counter. The thread ID generation circuit 36 outputs a thread ID, which is different from the thread ID of the hang prevention thread ID register 40, to the thread decision circuit 38. The thread selected by this thread decision circuit 38 becomes the hang prevention thread ID, and is sent to the executability selection circuit 52, 62 and 72, so as to select an entry which can be executed from the reservation station 54, 64 or 74.

Therefore by selecting the thread switching time using the thread switching time selection circuit 34, elapse time to select the same thread can be changed.

Now the executability selection circuit 52, 62 and 72 will be described with reference to FIG. 7. In the hang prevention mode, it is judged whether or not a thread of the entry of the reservation station 54, 64 or 74 matches with the thread selected by the thread selection circuit 30 in one previous cycle of the execution entry selection circuit 56, 66 or 76 (S22). If there is no match, processing advances to step S26.

For the entry of which a thread matches, it is judged whether or not this entry is ready for execution, and if ready, this entry is determined as an entry having a possibility to be selected by the execution entry selection circuit 56, 66 or 76 in the next cycle (S24). Then a flag, for example, is assigned to this entry.

The entry of which a thread does not match with the selected thread, on the other hand, is determined as an entry having no possibility to be selected by the execution entry selection circuit in the next cycle (S26).

In a cycle where an instruction is decoded and is newly registered in an entry in the reservation station, it is judged whether or not a thread of an entry registered from the entry generation circuit 50, 60 or 70 matches with a thread selected by the thread selection circuit 30 (S20). If there is no match, processing advances to step S26.

For the entry of which thread matches, it is judged whether or not this entry is ready for execution, and if ready, this entry is decided as an entry having a possibility to be selected by the execution entry selection circuit 56, 66 or 76 in the next cycle (S24). Then a flag, for example, is assigned to this entry.

The entry of which thread does not match with the selected thread, on the other hand, is decided as an entry having no possibility to be selected by the execution entry selection circuit in the next cycle (S26).

A thread selection example by the thread selection circuit 30 will be described with reference to FIG. 8. When it is detected that an instruction of a thread has not completed for a predetermined period, the hang prevention mode starts, and the thread selection circuit 30 is activated.

After entering the hang prevention mode, the thread switching time initially becomes 1 cycle mode, and the thread selection circuit 30 selects a different thread at every one cycle.

If the hang prevention mode is still continuing when 100 cycles are counted by the timer counter, the thread switching time becomes 2 cycle mode, so the thread selection circuit 30 selects a different thread at every 2 cycles.

If the hang prevention mode is still continuing when 300 cycles are counted by the timer counter, the thread switching time becomes 4 cycle mode, so the thread selection circuit 30 selects a different thread at every 4 cycles.

If the hang prevention mode is still continuing when 600 cycles are counted by the timer counter, the thread switching time becomes 16 cycle mode, so the thread selection circuit selects a different thread at every 16 cycles.

In this way, for a thread to be selected by the thread selection circuit 30, a pattern of selecting a same thread continuously for a predetermined period of operation can be changed according to many different patterns.

If an instruction which has not completed is completed, the hang prevention mode returns to the normal running state. And the thread selection circuit 30 is also reset. And if the hang prevention mode starts again, selection of a thread is started with the first state (a different thread is selected at every one cycle).

This hang prevention mode is activated when 2 or more threads operate in a simultaneous multi-thread, and the instruction execution control device never enters the hang prevention mode when only one thread is operating, since there is no need to select a thread. If there is a thread which is not operating when the hang prevention mode is activated, it can be controlled so that the thread selection circuit does not select this thread which is not operating.

FIG. 9 is a diagram depicting a control state of the reservation station when the hang prevention mode is activated by this thread selection in the state in FIG. 17.

At time T1, the hang prevention mode is activated. Since the thread selection circuit 30 selected thread 0 at time T1, an entry of the thread 0 is executed at time T2. The thread selection circuit 30 selects the thread 1 at time T2, but this overlaps with the timing of storing the result of the precedent instruction in the result register, therefore the entry of the thread 1 cannot be executed at time T3.

At time T4, the entry of the thread 0 is executed since the thread selection circuit 30 selected the thread 0 at time T3. At time T5, the entry of the thread 1, which could not be executed thus far, can be executed since the thread selection circuit 30 selected the thread 1 at time T4. At time T6, the entry in the thread 0 is executed since the thread selection circuit 30 selected the thread 0 at time T5.

When the instruction of the entry in the thread 1 is competed thereafter, the control of the reservation station returns from the hang prevention mode to the normal running state.

In the above mentioned description, the reservation station for floating point was used as an example. The reservation station for fixed point, however, has the entry execution restrictions depicted in FIG. 10. In other words, in the case of the reservation station for fixed point, the executed entry is controlled such that the next function execution, executed for a subsequent entry, is disabled until this execution completes.

If the entry to be executed from the reservation station is an entry requiring 2 cycles for execution (precedent instruction), and the subsequent instruction is also an entry requiring 2 cycles for execution, then the precedent instruction is executed from the reservation station at T1 as depicted in FIG. 10. An attempt to execute the subsequent instruction at timing T2 is disabled, since this execution (X) overlaps with the execution of the precedent instruction, and the execution is enabled at timing T3.

Therefore, just like the entry execution control of the reservation station for floating point in FIG. 9, entry execution for threads is possible.

In this way, when a plurality of threads are operating in a simultaneous multi-thread system, an entry which cannot be executed from the reservation station, depending on the timing of storing the function execution result in the result register or timing of executing the function, can be executed in the hang prevention mode by selecting a thread of the entry to be executed from the reservation station, whereby the hang state can be prevented.

Figure 11:
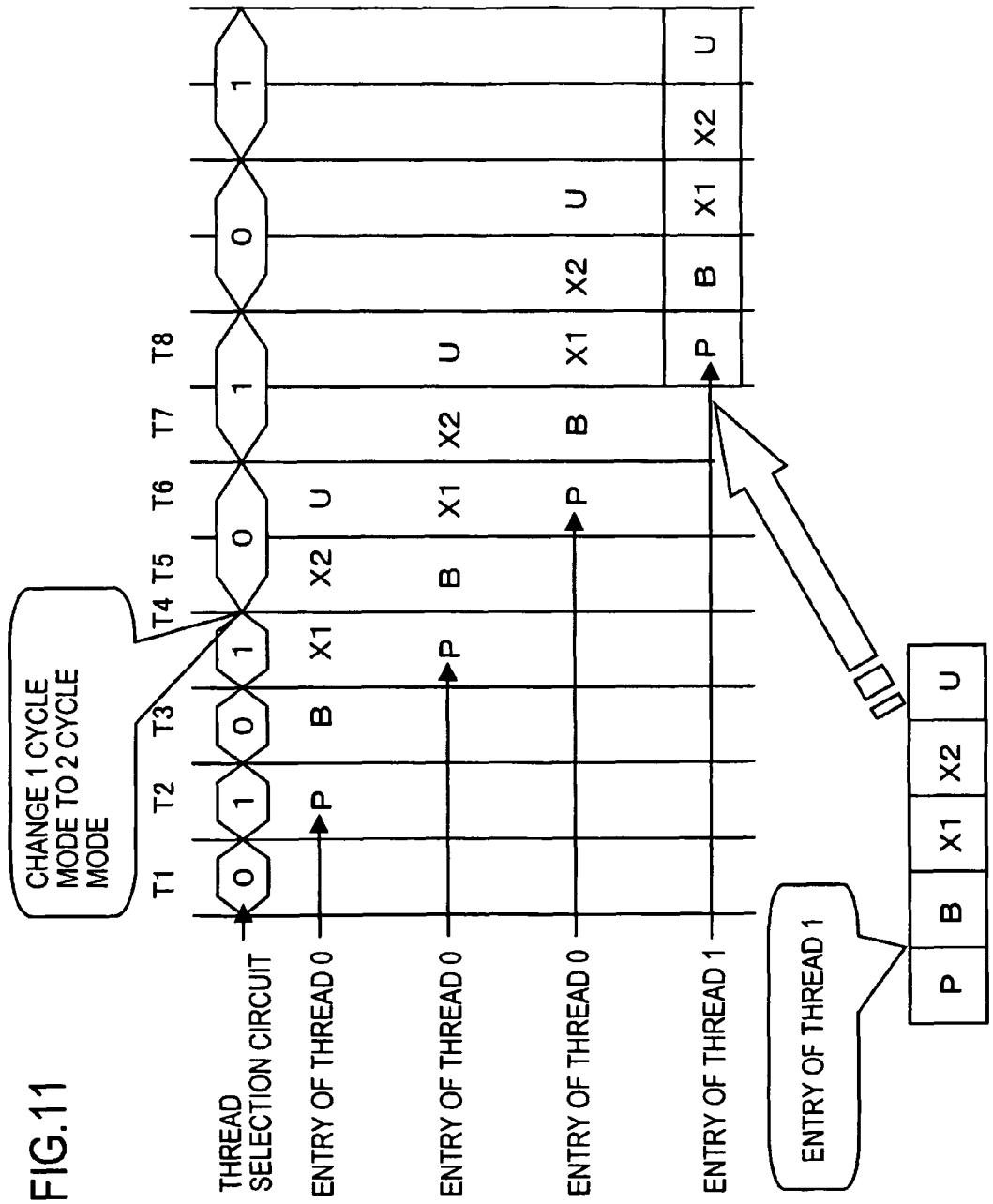
FIG. 11 is a diagram depicting an operation when thread time is changed in the thread selection circuit of FIG. 6.

An advantage of changing the switching cycle will now be described. FIG. 11 is an example when the hang prevention mode is activated during the simultaneous multi-thread operation, because an instruction in the entry of the thread 1 in the reservation station is not decoded by the instruction decoder, since it take a long time to acquire the data on a fetched instruction. In the state of this example, an entry requiring 2 cycles for execution is created in thread 1 when an entry requiring 2 cycles for execution is continuously decoded by the instruction decoder and executed in the thread 0 of the reservation station for fixed point.

As FIG. 11 depicts, at time T1, the thread selection circuit 30 selects the thread 0 in the 1 cycle mode. At time T2, the entry of the thread 0 selected by the thread selection circuit 30 can be executed. At this point, the thread selection circuit 30 selects the thread 1 for the 1 cycle mode.

At time T3, the entry which has all the operand data required for execution and is ready for execution cannot be executed, since this overlaps with the execution of the precedent instruction. At this time, the thread selection circuit selects the thread 0 for the 1 cycle mode. At time T4, the thread 0 is executed, and the thread selection circuit 30 selects the thread 1, but the thread 1 cannot be executed at time T5.

At this time, the 1 cycle mode is changed to 2 cycle mode because of the thread switching time. At time T7, the thread selection circuit 30 selects the thread 1, and the thread 1 can be executed at time T8.

In FIG. 11, the entry of the thread 1 can be executed when the mode changes to the 2 cycle mode, since time required for executing an instruction of the thread 0 when not in the hang state is 2 cycles. But if the time required for executing an instruction of thread 0 is 4 cycles, the entry of the thread 1 cannot be executed unless the mode becomes the 4 cycle mode.

In this way, when the hang prevention mode is activated because of a cause other than the reservation station, and function execution blocks processing of a subsequent instruction, it is preferable to set a time longer than the longest time required for function execution as a time to select a same thread continuously, which is a thread selection method in hang prevention mode.

For this, the thread selection circuit can change the thread to be selected depending on the elapsed time, and switches the thread based on the time of continuously selecting a same thread.

The time to continuously select a same thread can also be changed depending on the elapsed time.

Since only an entry of a thread selected by the thread selection circuit can be executed, a drop in performance when normal running time is expected, and since the performance drops more as the time to continuously select a same thread by the thread selection circuit becomes longer, a major drop in performance can be delayed by increasing the time to select a same thread in stages.

(Thread Selection Circuit)

Figure 12:
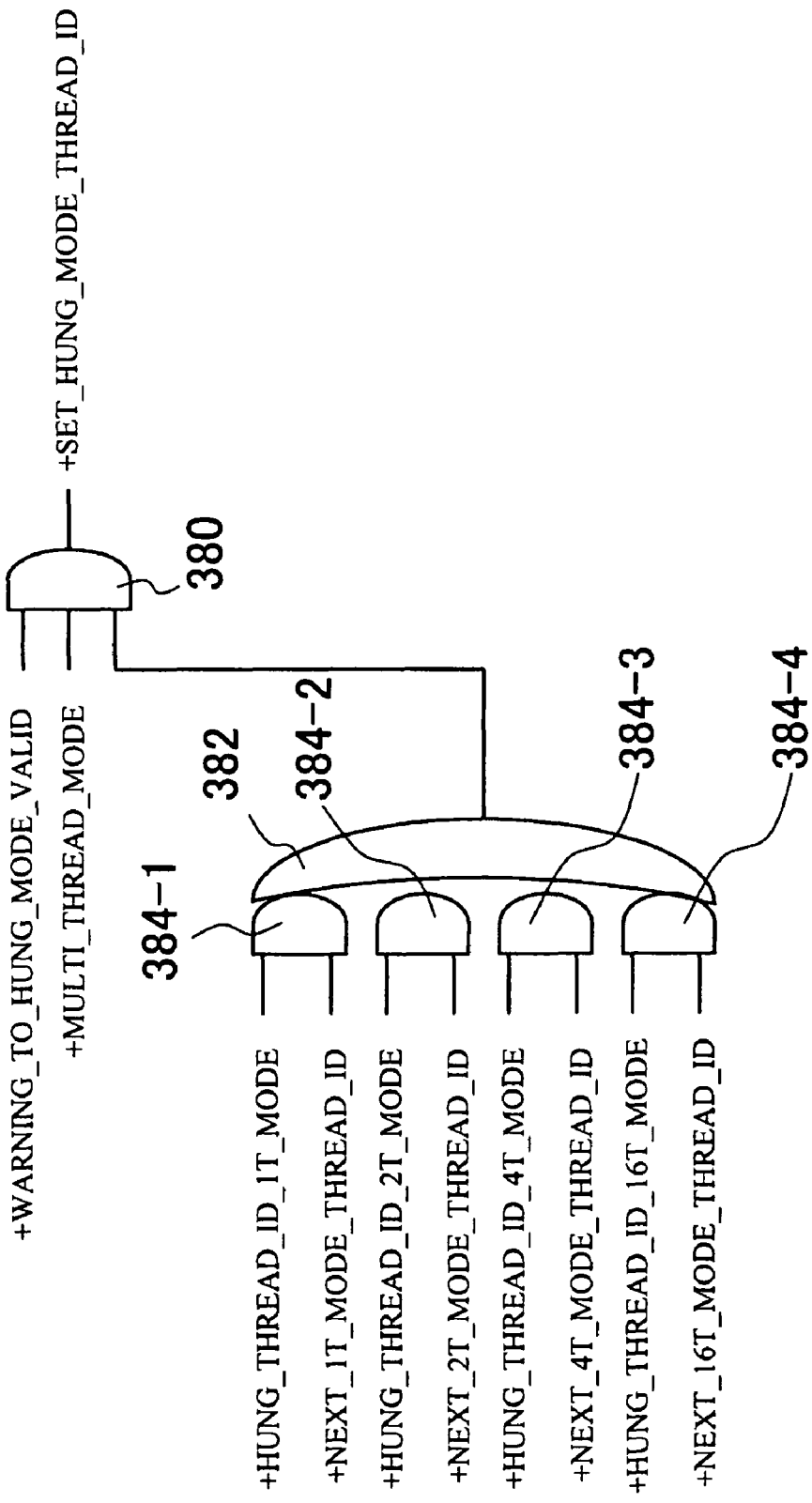
FIG. 12 is a circuit diagram of the thread decision circuit in FIG. 6.
Figure 13:
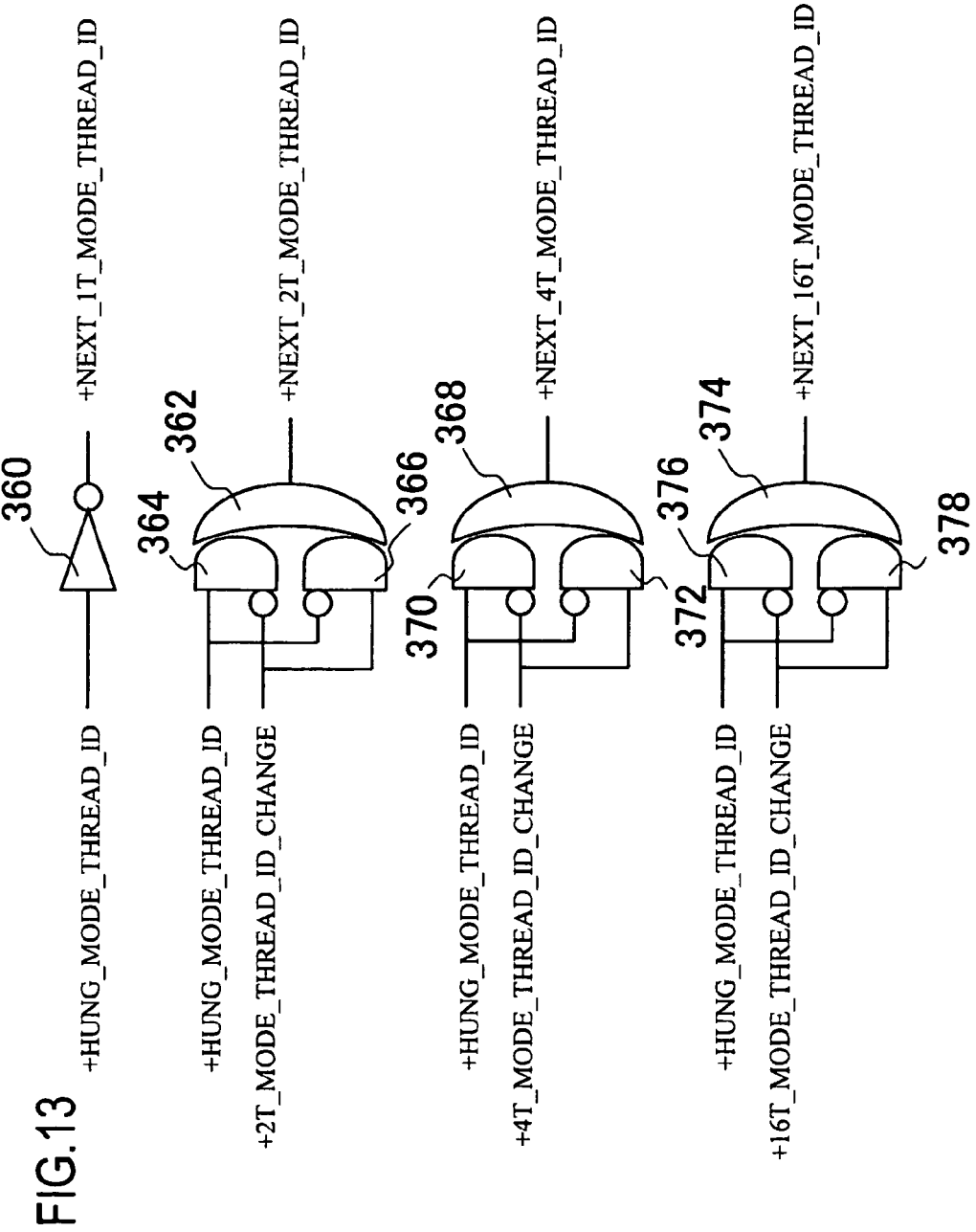
FIG. 13 is a circuit diagram of the thread ID generation circuit in FIG. 6.
Figure 14:
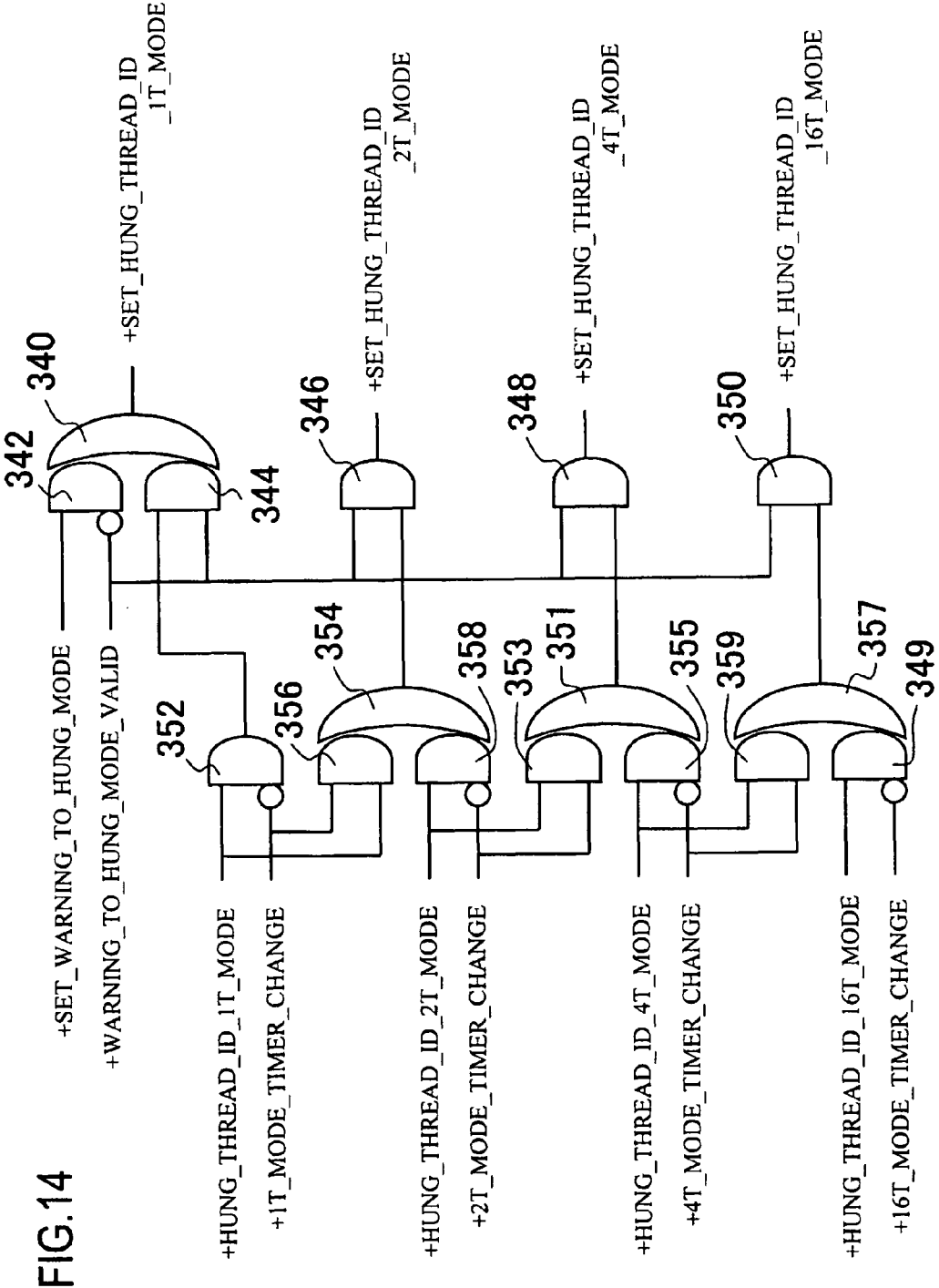
FIG. 14 is a circuit diagram of the thread switching time selection circuit in FIG. 6.

The above mentioned thread selection circuit 30 to select a thread will now be described. This thread selection circuit 30 is constructed by logical circuits. FIG. 12 is a circuit diagram of the thread decision circuit 38 in FIG. 6, FIG. 13 is a circuit diagram of the thread ID generation circuit 36, and FIG. 14 is a circuit diagram of the thread switching time selection circuit 34.

In FIG. 12, the thread decision circuit 38 is comprised of an AND gate 380, OR gate 382 and 4 AND gates 384-1 to 384-4. In FIG. 11, +WARNING_TO_HUNG_MODE_VALID signal is a signal to indicate that the signal to indicate the hang prevention mode was latched once. +MULTI_THREAD_MODE signal is a signal to indicate that the device is running in the multi-thread state. The AND gate 380 opens in the hang prevention mode and in the multi-thread state. In other words, the AND gate 380 does not operate if it is not in the hang prevention mode, or if it is not in the multi-thread state (that is, in the single thread state).

The +HUNG_THREAD_ID_1T_MODE signal is a signal to indicate that the selected thread is changed at every 1 cycle, and indicates a thread selected by the +NEXT_1T_MODE_THREAD_ID signal. This signal to indicate a selected thread is acquired in the circuit depicted in FIG. 12.

This combination of signals is provided for 1 cycle, 2 cycles, 4 cycles and 16 cycles, and a thread selected from 4 AND gates 384-1 to 384-4 is input to the AND gate 380 via the OR gate 382, and becomes a hang prevention thread ID in the next cycle.

The thread ID generation circuit in FIG. 13 is a circuit to determine a thread in the 1 cycle, 2 cycle, 4 cycle and 16 cycle mode. In 1 cycle mode, a thread changes at every cycle, so the inversion circuit 360 inverts the polarity of the +HUNG_MODE_THREAD_ID to indicate the hang prevention thread ID.

The circuits 362, 364 and 366 in the 2 cycle mode invert the polarity of +HUNG_MODE_THREAD_ID, which indicates the hang prevention thread ID, using the AND gate 366, if +2T_MODE_THREAD_ID_CHANGE, which indicates that 2 cycles have elapsed since the change of the thread, became ON. If +2T_MODE THREAD_ID CHANGE is OFF, the circuits 362, 364 and 366 output +HUNG_MODE_THREAD_ID to indicate the hang prevention thread ID from the AND gate 364.

The OR gate 362 outputs a signal to change the thread if +2T_MODE_THREAD_ID_CHANGE is ON, and a signal not to change the thread if +2T_MODE_THREAD_ID_CHANGE is OFF.

For 4 cycle mode and 16 cycle mode as well, if +4 T_MODE_THREAD_ID_CHANGE, to indicate that 4 cycles have elapsed, or if +16 T_MODE_THREAD_ID_CHANGE, to indicate that 16 cycles have elapsed is ON by the combination of 2 AND gates 370 and 372 or 376 and 378, and OR gate 368 or 374 respectively, the thread is changed.

FIG. 14 depicts a thread switching time change circuit. When +SET_WARNING_TO_HUNG_MODE, which is input to the AND gate 342 to indicate the hang prevention mode, is ON, and +WARNING_TO HUNG_MODE_VALID to indicate that this signal was latched once is OFF, 1 cycle mode is activated from the AND gate 342 and the OR gate 340 (the hang prevention mode is started). When one cycle mode is started and when the +1T_MODE_TIMER_CHANGE signal to indicate a time to switch to 2 cycle mode is OFF, and when +HUNG_THREAD_ID_1T_MODE, which indicates the 1 cycle mode, is ON, the 1 cycle mode is continued from the AND gate 352 by the AND gate 344.

If switching time occurs during the 1 cycle mode, the +1T_MODE_TIMER_CHANGE signal turns ON to switch to the 2 cycle mode via the AND gate 356, OR gate 354 and AND gate 346.

The same circuit is used for mode change from the 2 cycle mode to the 4 cycle mode or from the 4 cycle mode to the 16 cycle mode. In other words, each of these circuits has AND gates 353 and 355, OR gate 351 and AND gate 348; or has AND gates 359 and 349, OR gate 357 and AND gate 350.

Since the thread switching time is valid only during hang prevention, as described above, AND with a signal to indicate that the signal, to indicate that the hang prevention mode is latched once, is determined. This signal becomes the thread switching signal, and the signal latched once to select a thread is related to FIG. 12.

Other Embodiments

In the above embodiment, a simultaneous multi-thread system in which two threads (thread 0 and 1) operate simultaneously was described, but the present invention can also be applied to a system where three or more threads operate simultaneously.

The present invention was described using the embodiments, but the present invention can be modified in various ways within a scope of the spirit of the present invention, and these variant forms shall not be excluded from the scope of the present invention.

INDUSTRIAL APPLICABILITY

A state where an instruction is not completed for a predetermined period is detected during simultaneous multi-thread operation, and it is controlled so that all the reservation stations can execute only a predetermined thread, therefore if an entry that cannot be executed from the reservation station exists, execution of an entry in the thread that cannot be executed can be enabled by stopping the execution of the thread which has been continuously executed.

The invention claimed is:

1. An instruction execution control device for executing a plurality of threads including a plurality of instructions, comprising:
   an instruction decoder that decodes an instruction;
   a reservation station that receives a decoding result from the instruction decoder, and controls computing processing;
   a main storage reservation station that controls the generation of an address of an operand to be stored in a main storage;
   an instruction control mechanism which controls executed instructions so that the instructions are completed according to the sequence of a program; and
   a hang prevention circuit, comprises:
      a thread selection circuit that, when the instruction control mechanism detects that an instruction in one thread cannot be completed in a predetermined period, selects a thread of an entry that can be executed from all of the reservation stations to be same thread; and
      an executability selection circuit that, when a thread selected by the thread selection circuit matches with a thread of an entry of the reservation station, enables the entry to be executed from the reservation station.

2. The instruction execution control device according to claim 1, the thread selection circuit comprises a thread selection circuit that changes a thread to be selected depending on an elapsed time.

3. The instruction execution control device according to claim 1, the thread selection circuit prohibits selecting a thread which is not operating based on a signal to indicate a thread which is operating.

4. The instruction execution control device according to claim 1, the hang prevention circuit stops the control of the reservation station when the uncompleted instruction is completed.

5. The instruction execution control device according to claim 1, the reservation station comprises:
- an entry generation circuit that enters an instruction from the instruction decoder to the reservation station; and
- an execution entry selection circuit that selects an entry that can be executed from the reservation station.

6. The instruction execution control device according to claim 1, the reservation station executes an entry which is ready for execution, at a timing which does not overlap with the timing of executing the precedent entry or the timing of storing the execution result of the precedent entry.

7. An instruction execution control method for executing a plurality of threads including a plurality of instructions, comprising:
- creating an entry of a reservation station based on a decoding result by an instruction decoder, and issuing an entry which is ready for execution;
- creating an entry from the instruction by a main storage reservation station which controls the generation of an address of an operand to be stored in a main storage, and issuing an entry which is ready for execution to a main storage operand address generator;
- controlling the executed instructions so that the instructions are completed according to the sequence of a program;
- starting a thread selection circuit to select a thread of an entry that can be executed from all of the reservation stations to be same thread, when it is detected that an instruction in one thread cannot be completed in a predetermined period;
- judging whether a thread selected by the thread selection circuit matches with a thread of an entry of the reservation station; and
- enabling the entry to be executed from the reservation station when it is judged that the threads match with each other.

8. The instruction execution control method according to claim 7, the selecting further comprises changing a thread to be selected depending on an elapsed time.

9. The instruction execution control method according to claim 7, the selecting further comprises prohibiting selecting a thread which is not operating based on a signal to indicate a thread which is operating.

10. The instruction execution control method according to claim 7, further comprising ending the selecting when the uncompleted instruction is completed.

11. The instruction execution control method according to claim 7, further comprising processing an entry of the reservation station which is ready for execution, at a timing which does not overlap with the timing of executing the precedent entry or the timing of storing the execution result of the precedent entry.

* * * * *